United States Patent Office 3,383,169
Patented May 14, 1968

3,383,169
PROCESS FOR THE PREPARATION OF CRYSTALLINE AMMONIUM ZEOLITES
Dean Arthur Young, Yorba Linda, Calif., assignor to Union Oil Company of California, Los Angeles, Calif., a corporation of California
No Drawing. Filed May 20, 1965, Ser. No. 457,485
11 Claims. (Cl. 23—112)

ABSTRACT OF THE DISCLOSURE

Zeolitic alkali metal cations are rapidly and efficiently exchanged out of crystalline, alumino-silicate zeolites by subjecting such zeolites to ion exchange with ammonium salt solutions containing sufficient added acid to maintain a pH between about 2 and 4.5 during the exchange.

---

This invention relates to a novel method of preparing metal-cation-deficient molecular sieve zeolites. More particularly, this invention relates to an improved process for the preparation of the ammonium form of crystalline, zeolitic alumino-silicates of the molecular sieve type from acid-sensitive, alkali metal and/or alkaline earth metal zeolites by a novel ion-exchange procedure.

Briefly stated, the invention comprises ion-exchanging a substantial portion of the exchangeable metal cation of a crystalline, alumino-silicate zeolite having a $SiO_2/Al_2O_3$ mole-ratio between about 2 and 6 with ammonium ions in the presence of sufficient hydrogen ions to maintain a pH below about 4.5, but above about 2.0. The invention further contemplates calcining the resulting ammonium zeolite at a temperature above about 600° F. for a sufficient length of time to effect thermal decomposition of the zeolitic ammonium ions, with resultant formation of a hydrogen and/or "decationized" molecular sieve zeolite. The ammonium ion-exchange procedures heretofore employed require extended, multistage contacting of the zeolite with large volumes of ammonium salt solutions, if a substantially complete exchange is required. These exhaustive treatments are time-consuming and expensive, and the major object of this invention is to provide convenient, rapid and economical methods for achieving 90–100% exchange of ammonium ions for zeolitic metal cations such as sodium.

The preparation of metal-cation-deficient, aluminosilicate zeolites involves the replacement of the original zeolitic metal cations, particularly the alkali metal and alkaline earth metal cations, with hydrogen cations or their complete removal with resultant formation of a "decationized" zeolite. To these ends, it has recently been discovered (U.S. Patent No. 3,130,006) that certain silica-rich zeolitic molecular sieves can be prepared in their ammonium form by ion-exchanging the initial zeolite, usually in a sodium form, with a ammonium salt solution. The ammonium form can then be decomposed at relatively high temperatures to produce a deammoniated zeolite which exhibits a high degree of crystallinity, high surface area, and relatively high acidity. The procedures followed in this patent to remove the sodium cation include (1) ion-exchanging with unbuffered ammonium salts at pH values substantially greater than 4.5, and (2) acid extraction to form the hydrogen zeolite directly. The preferred method involves exhaustive, batch-wise ion-exchange procedures using large volumes of ammonium salt solutions. But even after extended ammonium ion exchange, the zeolite still retains appreciable amounts of sodium. The acid extraction procedure is even less successful in effecting complete removal of sodium, usually removing less than half, unless strong acids are used which attack the zeolite framework, resulting in dissolution of the alumina and essential loss in zeolite crystallinity.

It has now been discovered that crystalline 90–100% ammonium zeolites may be efficiently prepared from their sodium or other metal forms by the process of this invention, which comprises contacting an acid-sensitive, crystalline, alumino-silicate zeolite having a $SiO_2/Al_2O_3$ mole-ratio between about 2 and 6 with an ammonium salt solution containing sufficient added acid to maintain a pH between about 2.0 and 4.5, and preferably between about 2.5 and 4.0, during the entire ion exchange treatment. It is within the contemplated scope of the invention to use either batch or continuous treatment while still maintaining the desired pH range. Specifically, it is contemplated that the pH be maintained between 2.0 and 4.5 by the continuous or periodic addition of a mineral or organic acid. A weak acid such as acetic acid is preferred because of its greater buffering effect.

The zeolites contemplated herein comprise the acid-sensitive molecular sieves, and are composed usually of silica, alumina, and one or more exchangeable cations such as sodium, magnesium, calcium, etc. They are further characterized by having a $SiO_2/Al_2O_3$ mole-ratio between about 2.0 and 6.0, and crystal pores of relatively uniform diameter, usually between about 4 and 14 A. Suitable zeolites found in nature include for example analcite, chabazite, erionite, and faujasite. Suitable synthetic molecular sieve zeolites include, for example, those of the A, X, Y, and L crystal types, or synthetic forms of the natural zeolites noted above.

The naturally occurring crystalline zeolites are usually found in an alkaline earth metal form, or mixed alkaline earth-alkali metal forms. The synthetic molecular sieves normally are prepared first in the sodium or potassium forms. In their sodium form, the general formula for the preferred Y molecular sieve zeolites of this invention is expressed as follows:

$$0.9 \pm 0.2 Na_2O : Al_2O_3 : wSiO_2 : xH_2O$$

where $x=0$ to about 9, and $w=3$ to about 6.

For use as a cracking base, or in other acid-catalyzed reactions, it is preferred that most or all of the original zeolitic monovalent metals be ion-exchanged out with ammonium ions followed by heating to decompose the zeolitic ammonium ions, leaving in their place hydrogen ions and/or exchange sites which have actually been decationized by further removal of water:

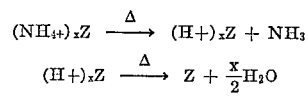

As to the final zeolite produced, there is some uncertainty as to whether the heating of the ammonium zeolite produces a hydrogen zeolite or a "decationized" (cation-deficient) zeolite, but it is clear that, (a) hydrogen zeolites are formed upon initial thermal decomposition of the ammonium zeolite, and (b) if true decationization does occur upon further heating of the hydrogen zeolites, the decationized zeolite also possesses desirable catalytic activity. Both of these forms, and the mixed forms, are designated herein as being "metal-cation-deficient".

This invention is also useful in the manufacture of mixed hydrogen-polyvalent metal zeolites. Thus, the ammonium zeolite of this invention may be back-exchanged with metal salt solutions, preferably polyvalent metals such as magnesium, zinc, calcium, or rare earth metal salts, to prepare a mixed metal-ammonium zeolite which may then be calcined to form the mixed hydrogen-polyvalent metal zeolite.

It it is desired to use the foregoing zeolites as hydrocracking or isomerization catalysts, it is preferred to activate the same by incorporating a minor proportion of a suitable metal hydrogenating component, normally a Group VI–B and/or Group VIII metal. The preferred hydrogenating metals comprise the Group VIII noble metals, and particularly palladium, platinum or rhodium. Other specific promoters which may be employed include e.g., tungsten, molybdenum, chromium, manganese, etc. The quantity of such metals can vary within wide ranges. Generally, any amount between 0.1 percent and about 20 percent by weight may be used. In the case of the noble metals, it is normally preferred to use about 0.2 percent to 2.0 percent by weight. The preferred method of adding the hydrogenating metal is by ion-exchange. This is accomplished by digesting the ammonium zeolite in an aqueous solution of a suitable compound of the desired metal wherein the metal is present in a cationic form, as described for example in Belgian Patent No. 598,686. The metal-ammonium zeolite may then be subjected to final calcining and activation in order to convert the remaining ammonium ions to hydrogen ions.

There are several different procedures by which the acid-sensitive zeolites can be converted to the metal-cation-deficient forms of this invention, two of the most practical methods being as follows:

Method 1, continuous exchange.—An acid, preferably a strong mineral acid, is added to an aqueous slurry of the sodium zeolite until the pH is between about 2.0 and 4.5. Then the slurry is charged to a filter press, or other suitable vessel having a porous support for the zeolite. An ammonium salt solution acidified with a weak acid, e.g. ammonium nitrate and acetic acid, with a pH between 2.0 and 4.5, is percolated through the bed until the desired degree of replacement of sodium ions has occurred. Then the exchanged material is washed with dilute, e.g. 1%, aqueous ammonium hydroxide to remove traces of acid prior to drying or calcining. The metal-cation-deficient zeolite is thereafter prepared by heating to decompose the zeolitic ammonium ions.

Method 2, batch exchange.—The sodium zeolite is slurried with an aqueous ammonium salt solution. Sufficient strong mineral acid is gradually added to this slurry to maintain the pH between 2.0 and 4.5 during the following 10 to 90 minutes. Then the slurry is filtered, the filter cake resuspended in ammonium nitrate, and acidified to a pH of 2 to 4.5 for the next exchange period. This procedure is repeated until the desired replacement of sodium ions has occurred. Then the zeolite is washed with aqueous amonia, drained, dried and heated to decompose the ammonium ions, thereby forming a corresponding hydrogen, and/or decationized zeolite.

The first of these methods is preferred, mainly because it provides for automatic control of pH throughout the length of the zeolite bed by virtue of using a weak buffering acid. Moreover, in the initial acidification, where pH can be easily controlled by external mechanical means and kept uniform throughout the slurry, a strong mineral acid may be employed thereby reducing costs. But if a strong mineral acid is employed during the continuous exchange treatment, there will be a tendency to develop a large pH gradient in the zeolite bed, which makes for inefficiency.

In the second, or batch, method there is little advantage to be gained by using the more expensive weak acids, and hence strong mineral acids may be employed throughout, with the attendant disadvantages of multi-stage batch operations.

By these or other procedures contemplated herein the $Na_2O$ content of the zeolite can easily be reduced to below about 3 percent by weight, preferably to between about 0 and 1.5 percent, This means that more than about 80 to 90 percent, and preferably at least about 90 to 99 percent of the zeolitic sodium is replaced with ammonium ions, and this can be accomplished in times ranging from about 1 hour to 20 hours, without significant sacrifice of crystallinity.

Any other conventional liquid-solid contacting procedure is contemplated for the ammonium ion exchange. The essential requirement is to maintain the slurry within the stated pH ranges by the continuous or intermittent addition of acid. Normally, the exchange is carried out at ambient room temperatures of e.g. 15–30° C., but elevated temperatures of e.g. 50–150° C. are advantageous in hastening the reaction, as is the use of solutions which are fairly concentrated in ammonium salt, e.g. 5–15 molar. Examples of suitable ammonium salts include ammonium nitrate, ammonium chloride, ammonium sulfate, ammonium citrate, ammonium acetate, etc. Suitable acids include nitric, hydrochloric, sulfuric, acetic, formic, etc.

It has been found that weak acids are preferable to strong acids in the exchange step because the buffering effect furnished by the weak acid counteracts the continuous alkaline reaction of the sodium zeolite. Sodium Y-zeolite in contact with an aqueous solution functions as a slowly hydrolyzing salt of a weak acid and a strong base. If a strong acid is employed during the ammonium ion exchange, the desired pH levels cannot be maintained without continuous, carefully controlled addition of incremental amounts thereof. By employing weak acids having a dissociation constant below about $10^{-2}$, a stoichiometric excess can be employed without lowering the pH below about 2.0, thus avoiding the necessity of carefully controlled continuous addition of acid. Suitable weak acids include phosphoric, formic, acetic, propionic, butyric, citric, tartaric, etc.

The following examples are cited to illustrate the invention, but are not to be construed as limiting in scope:

Example I

To demonstrate the effect of pH on the completeness of exchange of sodium for ammonium ions, four 5-gram samples of a sodium zeolite Y (9.2 wt. percent $Na_2O$; 5.16 $SiO_2/Al_2O_3$ mole-ratio; 93% crystallinity) were subjected to continuous ion exchange for 80–115 minutes at 95–100° C., by percolating through each sample supported on a filter plate 200 ml. of a 20% ammonium nitrate solution to which varying amounts of ammonium hydroxide, nitric acid or acetic acid had been added in order to obtain the desired pH. The results were as follows:

TABLE 1

| Sample | pH Adjusted by Adding | pH During Exchange [1] | Residual $Na_2O$, Weight Percent | Percent $Na_2O$ Removed |
|---|---|---|---|---|
| A | 1.6 ml. 15 N $NH_4OH$ | 8.7 | 1.7 | 82 |
| B | 0.1 ml. 15 N $NH_4OH$ | 7.0 | 1.3 | 86 |
| C | 0.7 ml. 16 N $HNO_3$ | 6.0 | 0.99 | 89 |
| D [2] | 0.4 ml. 17.4 N AcOH | 3.0 | 0.40 | 96 |

[1] As measured in effluent exchange liquor.
[2] pH of this sample initially adjusted to 3.0 by slurrying in 20 ml. of water containing 5.7 ml. of 17.4 N acetic acid (in order to overcome buffering effect of Na-Y sieve).

None of these treatments had any significant effect on crystallinity of the zeolite.

It is readily apparent that pH has a substantial effect on the completeness of exchange obtainable in a given number of stages. In fact, the ionic activity coefficient of sodium in the Y-sieve appears to be proportional to the logarithm of the hydrogen ion concentration. However, this promoting effect of acid on the zeolitically bound sodium can only be utilized in the presence of a third cation such as ammonium, as shown in the following example:

Example II

Two additional 5-gram samples of the Na-Y sieve employed in Example I were adjusted to pH 3.0 by slurrying in aqueous acid, and then subjected to ion exchange as described in Example I with aqueous acid solutions free of ammonium ion. The results were as follows:

TABLE 2

| Sample | Ion-Exchange Solution | pH During Exchange | Residual Na₂O, Weight Percent | Percent Na₂O Removed |
|---|---|---|---|---|
| E | 200 ml 0.044 N AcOH | 3.0 | 8.1 | 12 |
| F | 200 ml 0.01 N HNO₃ | 3.0 | 7.9 | 14 |

Obviously, direct acid treatment is relatively ineffective for removing zeolitic sodium.

Example III

This example shows that acid-ammonium ion exchange also decreases the total quantity of ammonium salt solution required to effect a given degree of exchange. Two parallel, 3-stage batch exchanges were carried out, using in each case 200 gms. of a Na-Y molecular sieve having a $SiO_2/Al_2O_3$ mole-ratio of 4.69 and a $Na_2O$ content of 7.1%. In series G, the three exchanges were carried out with aqueous ammonium nitrate solutions. In series H, acetic acid was partially substituted for $NH_4NO_3$ during the first exchange and completely substituted for $NH_4NO_3$ during the second exchange. The total combined equivalents of $NH_4NO_3 + HOAc$ during the three exchanges was equal to the total equivalents of $NH_4NO_3$ during the three exchanges of the G series. The results were as follows:

TABLE 3

| Exchange Series | G | | H | |
|---|---|---|---|---|
| | Equivalents of— | | Equivalents of— | |
| | NH₄NO₃ | AcOH | NH₄NO₃ | AcOH |
| First Exchange | 1.98 (pH=5.8) | 0.0 | 1.63 (pH=2.5) | 0.35 |
| Second Exchange | 1.28 | 0.0 | 0.0 | 1.23 |
| Third Exchange | 2.50 | 0.0 | 2.50 | 0.0 |
| Total Equivalents | 5.76 | 0.0 | 4.13 | 1.63 |
| Total Ratio, NH₄/Na | 12.6 | | 9.0 | |
| Na₂O Content of Exchanged Zeolite, wt. percent | 2.6 | | 2.1 | |
| Percent Na₂O removed | 63 | | 70 | |

It is thus apparent that in series H, more sodium was removed with less ammonium salt than was required in series G.

Example IV

This example illustrates a practical batch-exchange procedure using a weak acid to reduce the $Na_2O$ content of a Y-sieve to below 1% by weight.

One hundred grams of an 89% crystalline, sodium Y molecular sieve containing 44.1% $H_2O$ and 7.1% $Na_2O$ (12.7% $Na_2O$ on a dry basis) was first acidified by slurrying in 500 milliliters of distilled $H_2O$ to which was added sufficient glacial acetic acid to give an initial pH of 2.8. The acidified zeolite was filtered off, washed with water and then subjected to four successive batch exchanges with acidified 1.0 molar ammonium nitrate solution, each batch containing 2.96 equivalents of ammonium nitrate (per equivalent of $Na_2O$ originally present in the zeolite), and sufficient added acetic acid to give an initial pH of 2.8. Each exchange consisted of heating the slurry to 90°–100° C. for 30 minutes followed by filtering, and reslurrying. During each exchange the pH rose to about 3.4

The exchanged zeolite was then washed in a 1% solution of $NH_4OH$, dried at 100° C. for 16 hours, and calcined at 540° C. for 12 hours to remove water and decompose the ammonium ions. The resulting zeolite composition was then found to contain 0.37% by weight of residual $Na_2O$, calculated on a dry basis, indicating that about 97.1% of the original sodium had been replaced with ammonium ions.

Example V

Another four-batch exchange was carried out in the same manner as described in Example IV, except that nitric acid was employed throughout instead of acetic acid, and sufficient 1.0 molar ammonium nitrate solution was used in each exchange to provide 3.26 equivalents of ammonium nitrate per equivalent of $Na_2O$ originally present in the zeolite. In this series, the pH of each exchange slurry rose from 2.8 to about 3.7 (instead of 3.4), thus demonstrating the buffering effect of acetic acid.

In this case, even though a total of 13.0 equivalents of $NH_4NO_3$ per equivalent of $Na_2O$ was employed (as compared to 11.8 equivalents in Example IV), the final zeolite contained 0.81% $Na_2O$, indicating that about 93.6% of the original sodium had been replaced with ammonium.

It is not intended that the invention should be limited to the details described above since many variations may be made by those skilled in the art without departing from the scope or spirit of the following claims.

I claim:

1. A method for the manufacture of a crystalline ammonium zeolite of the molecular sieve type, which comprises contacting an alkali metal alumino-silicate molecular sieve zeolite with an aqueous solution of an ammonium salt containing sufficient added acid to maintain a pH between about 2 and 4.5 during said contacting, and continuing said contacting for a sufficient time to exchange out at least about 80% of the original zeolitic alkali metal cations in said molecular sieve zeolite.

2. A method as defined in claim 1 wherein said added acid is a weak acid having a dissociation constant below about $10^{-2}$.

3. A method as defined in claim 1 wherein said contacting is carried out by percolating said acidified ammonium solution through a bed of said molecular sieve zeolite.

4. A method as defined in claim 1 wherein said contacting is carried out by slurrying said molecular sieve zeolite series-wise in a plurality of batches of said acidified ammonium salt solution.

5. A method as defined in claim 1 wherein said molecular sieve zeolite is a sodium Y molecular sieve having a $SiO_2/Al_2O_3$ mole-ratio between about 3 and 6.

6. A method for the manufacture of a crystalline ammonium zeolite of the molecular sieve type, which comprises first slurrying a sodium alumino-silicate molecular sieve zeolite having a $SiO_2/Al_2O_3$ mole-ratio between about 2 and 6 in an aqueous media to which sufficient acid has been added to provide a slurry having a pH between about 2 and 4.5, then contacting the resulting acidified zeolite with an acidified aqueous solution of an ammonium salt containing sufficient hydrogen ions to maintain a pH between about 2 and 4.5 during said contacting, and continuing said contacting for a sufficient time to exchange out at least about 80% of the total original zeolitic sodium in said molecular sieve zeolite.

7. A method as defined in claim 6 wherein said added acid is a strong acid having a dissociation constant above about $10^{-2}$.

8. A method as defined in claim 6 wherein sufficient weak acid having a dissociation constant below about $10^{-2}$ is added to said ammonium salt solution to maintain said pH between about 2 and 4.5 during said contacting.

9. A method as defined in claim 6 wherein said contacting is carried out by percolating said acidified ammonium salt solution through a bed of said molecular sieve zeolite.

10. A method as defined in claim 6 wherein said contacting is carried out by slurrying said molecular sieve zeolite series-wise in a plurality of batches of said acidified ammonium salt solution.

11. A method as defined in claim 6 wherein said molecular sieve zeolite is a sodium Y molecular sieve having a $SiO_2/Al_2O_3$ mole-ratio between about 3 and 6.

References Cited

UNITED STATES PATENTS

| | | | |
|---|---|---|---|
| 2,971,904 | 2/1961 | Gladrow et al. | 252—455 |
| 3,130,006 | 4/1964 | Rabo et al. | 23—111 X |
| 3,140,252 | 7/1964 | Frilette et al. | 252—455 X |

EDWARD J. MEROS, *Primary Examiner.*